United States Patent

[11] 3,617,232

[72] Inventor Robert C. Goodwin
 Lancaster, Ohio
[21] Appl. No. 68,329
[22] Filed Aug. 31, 1970
[45] Patented Nov. 2, 1971
[73] Assignee Anchor Hocking Corporation
 Lancaster, Ohio

[54] SELF-ACTING CONNECTOR FOR APPLYING COOLANT AIR TO GLASS MOLDS
 5 Claims, 5 Drawing Figs.
[52] U.S. Cl............................................. 65/267,
 65/355, 65/356, 65/361
[51] Int. Cl......................................... C03b 9/14,
 C03b 9/38
[50] Field of Search............................................. 65/356,
 355, 267

[56] References Cited
 UNITED STATES PATENTS
 443,403 12/1890 Neville........................ 65/356

| 2,402,475 | 6/1946 | Waterbury et al............ | 65/355 |
| 2,485,836 | 10/1949 | MacCunnell, Jr............ | 65/356 |
| 3,077,096 | 2/1963 | Olson et al..................... | 65/355 X |
| 3,338,699 | 8/1967 | Colch Agoff et al.......... | 65/356 |
| 3,499,746 | 3/1970 | Blankenship et al.......... | 65/355 X |

*Primary Examiner*—Frank W. Miga
*Attorney*—Wood, Herron & Evans

ABSTRACT: A connector for coupling a compressed air source with an internally cooled mold half for use on a multiple gob individual section glassmaking machine. The connector permits the compressed air source to be automatically and quickly connected to a mold half as the mold is hung in place on the hanger arm of an IS machine. It also permits the compressed air source to be automatically and quickly disconnected from a mold half as the mold is lifted off the hanger arm. The connector is automatic or self-acting in the sense that the connection is made or broken simply by lifting the mold half onto or off the hanger arm; no manual attention to the connection is required.

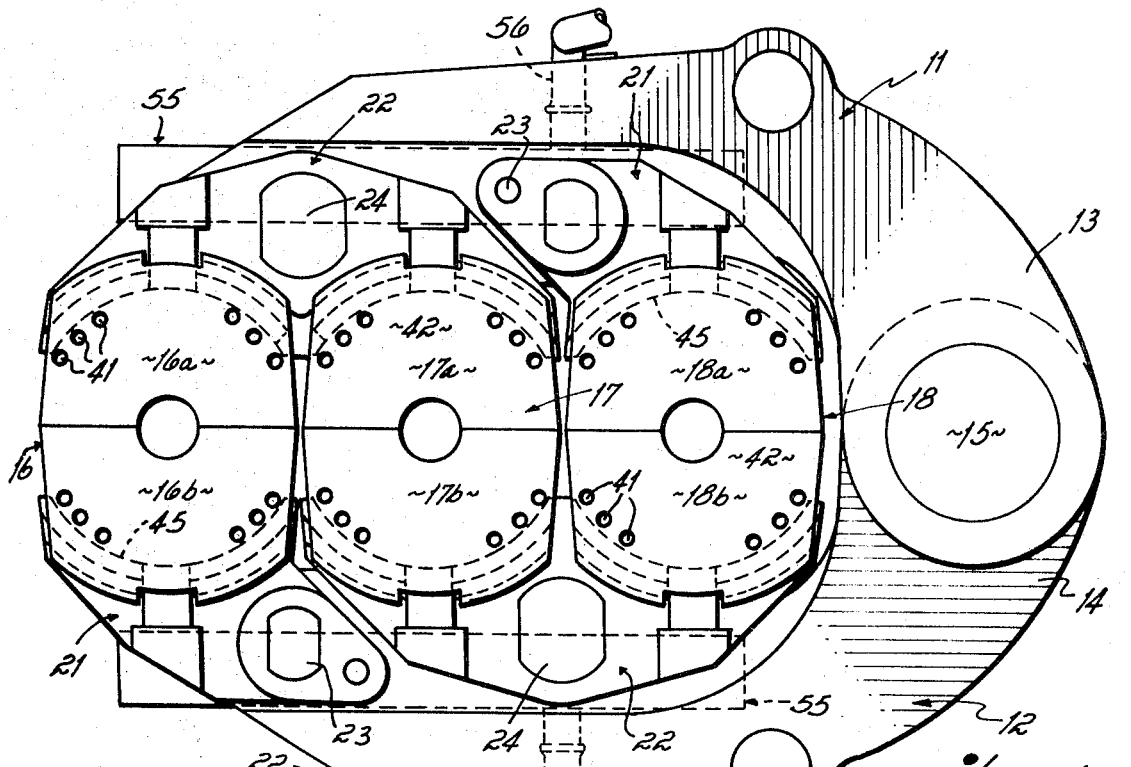
Fig. 1
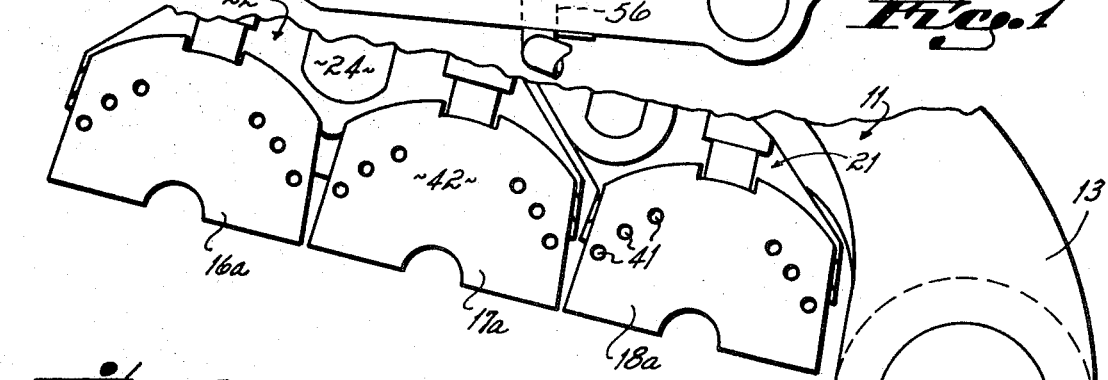
Fig. 2
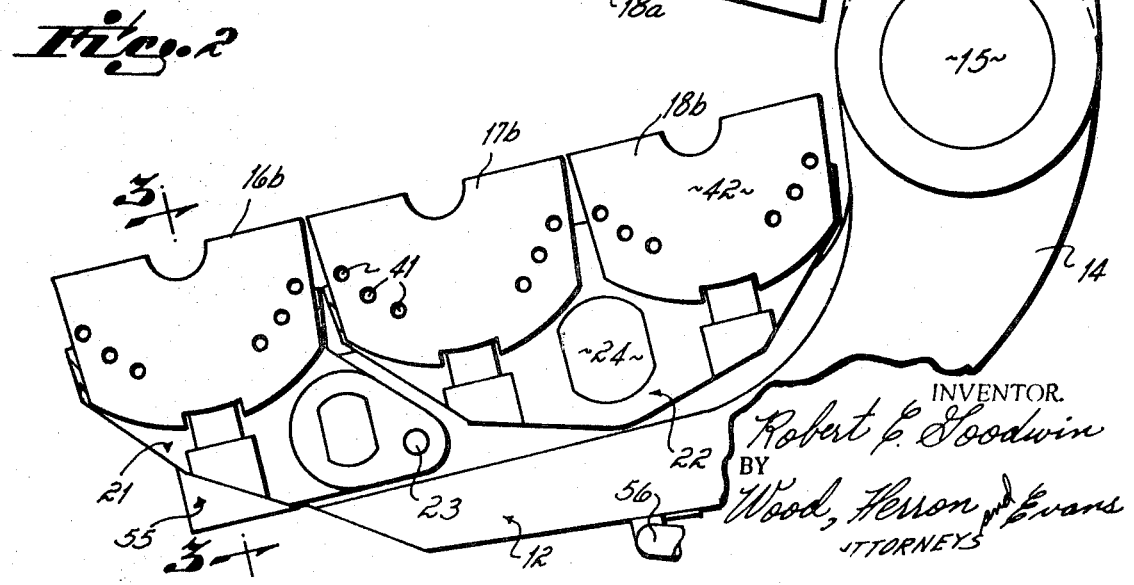

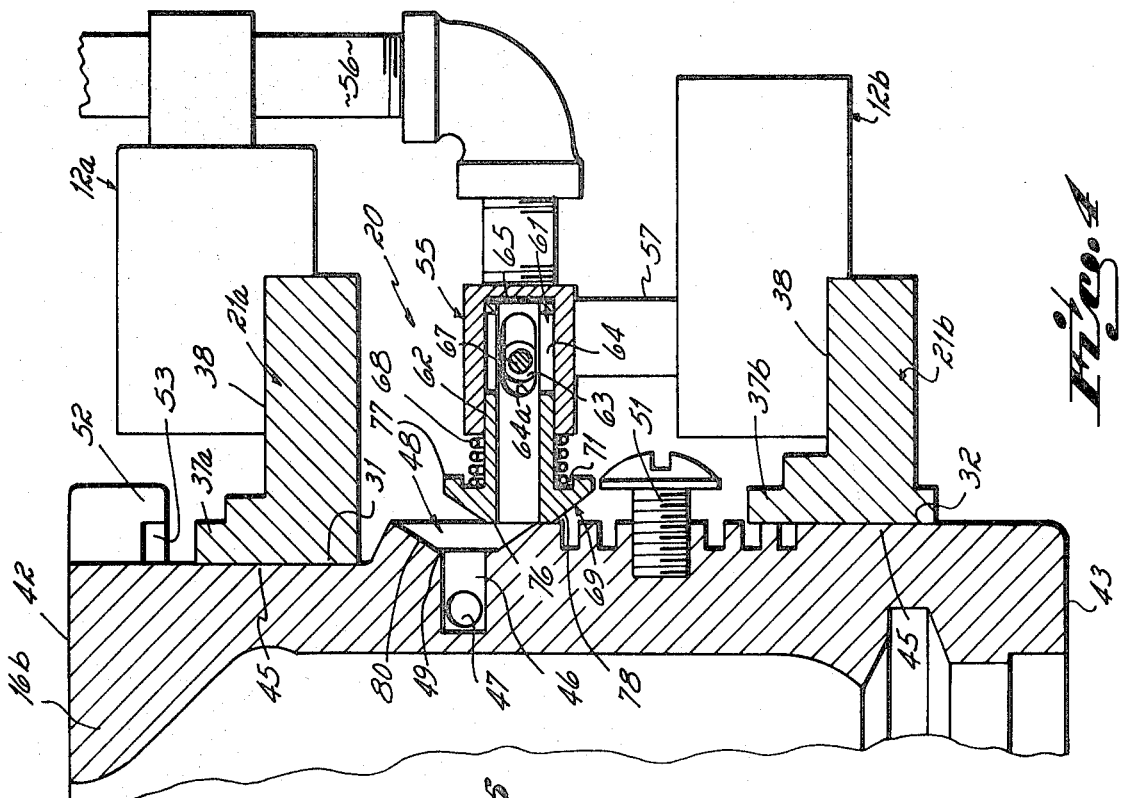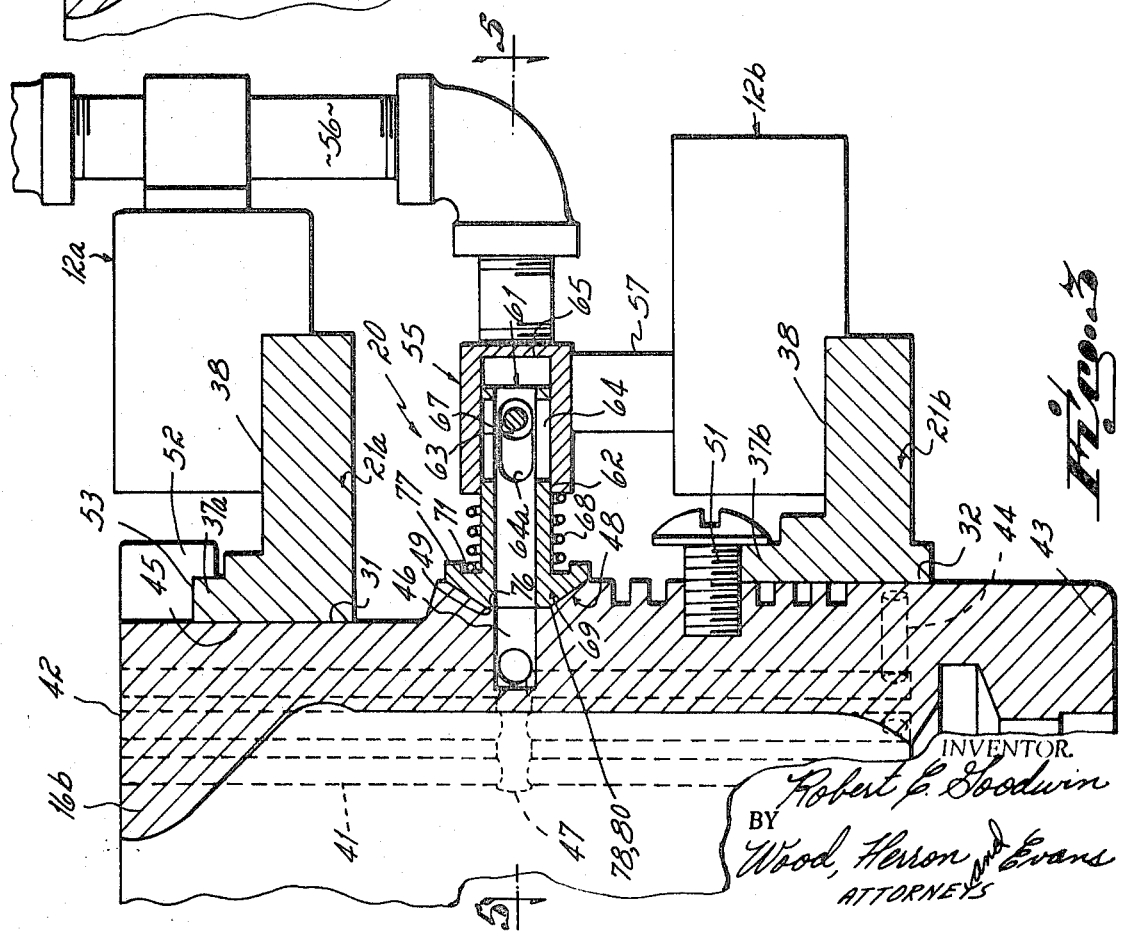

SELF-ACTING CONNECTOR FOR APPLYING COOLANT AIR TO GLASS MOLDS

This invention relates to pressure connectors and, more particularly, to a self-acting connector for quickly making or breaking a connection between a compressed air coolant source and coolant passages in molds for making glass articles.

In present high-rate production of glassware, the articles are commonly formed at least in part by molding steps performed by individual section (IS) glass-forming machines. Such machines have several sections (typically six) at each of which one, two or three gobs of molten glass are formed at the same time.

Each IS machine accepts molds of different configurations for the production of articles of the many various shapes to be sold. Although the cavity configurations may differ greatly from mold to mold, different molds are externally adapted for use with the same machine. Thus, each time it is desired to change the product being manufactured, the six, twelve or eighteen (or more) molds of the machine must be changed. The change requires stopping the machine. Whenever a single mold or mold half requires replacement because of wear, checking or cracking, or other defect, at least the section including that mold must be stopped.

The mold halves at each section are held or supported in position on two opposed hanger arms each adapted to hold one or more mold halves within its grip. The hanger arms of each section are pivotally mounted, like a scissors or pincers, for swinging movement relative to one another. The arms are swung closed to bring the respective mold halves together for molding, and they are swung open to remove the formed article. The mold halves can be removed or changed by lifting each mold half manually off of or onto the respective hanger arm. Each hanger arm carries hanger inserts, and it is on these hanger inserts that the respective mold halves are hung from the arm.

The outer periphery or vertical side surface of each mold half is usually provided with a rim, shoulder, hook or other attaching means adapted to fit over a cooperating element on the hanger arm or insert. When hanging or removing a mold half from a hanger arm, the side of mold half is generally positioned flush against the hanger arm and the mold half is then moved vertically until it is engaged or disengaged, respectively, with the hanger arm. To remove the mold half it is lifted vertically upward until its attaching means clears the cooperating attaching means on the hanger arms, and it is then moved away. To hang the mold half it is positioned in an attitude where its attaching means is aligned with the cooperating means on the arms, and then it is dropped vertically downward until it interengages and hangs on the hanger arm.

When the IS machine is in operation, each gob of glass transfers a substantial quantity of heat to the mold. At high rates of production (e.g. about 9-11 articles per minute per mold), temperatures begin to reach a point where mold temperature limits further rate increases; heat cannot be dissipated from the mold much faster to chill the article sufficiently to prevent sag. Further, prolonged use of the mold at such rapid high-temperature cycles tends to reduce substantially the service life of the mold.

To combat this problem of heat removal from IS molds, it is desirable to cool the molds while they are in use. To that end, mold halves are provided with internal air coolant passages. Typically these are internal bores with a series of outlets to atmosphere. These bores are connected with a compressed air source so that relatively cool air flows through the molds in use, and this helps keep the temperature level of the mold within acceptable limits and enables high production speeds to be used. It is toward the interconnection of the compressed air source with the individual mold halves that the connector of this invention is directed.

Connectors are known by which a compressed air source is coupled to a mold half. One basic type of connection which has been used in the past is a threaded nozzle on an inlet air line on the hanger arm, which is screwed into a cooperating bore in the mold half to feed the internal mold coolant passage.

Another type of connector construction includes a spring-loaded sleeve mounted on the hanger arm. The compressed air source is connected to feed axially through the sleeve. The sleeve is pushed plungerlike into a deep mating socket in the mold half, the socket feeding the coolant passage in the mold half. To make the connection, the sleeve must be manually gripped by a knob fixed at one end and then pulled back or retracted out of the way while the mold half is mounted on the hanger arm. Thereafter, the sleeve is pushed into the socket in the mold half, and is held therein by the spring. To release this connection, the sleeve must again be manually gripped by the knob and pulled out of the socket in the mold half, sufficiently that the mold half will clear it while being lifted off the hanger arm. The sleeve must be manually held in the retracted position until the mold half is removed.

It will be understood that IS machines mold glass at very fast rates. The low cost of, for example, glass containers, is in part due to this fast rate of production. Virtually any slowdown in the changing of molds on an IS machine is a costly matter, and this makes it highly desirable to make such changes as quickly as possible. Moreover, the molds, indeed the entire environment surrounding them, are quite hot. This complicates coolant line coupling where manual operations are involved. But for the connectors described above, air cooled mold halves can be removed from the hanger arms simply by lifting them off, and can be hung on the hanger arms simply by lifting them into place. Both types of other connectors described above require manual connection and disconnection of the compressed air source to the mold half, which is both slow and involves prolonged operator exposure to possible burn injury. Further, the sleeve connector requires more than one pair of hands to do the job, since the spring-loaded sleeve must be held retracted while the mold half is lifted on and off the hanger arms. This slows mold changes substantially. If the mold half is not air cooled, i.e., if no connector is required, the mold half is simply lifted onto or off the hanger arm, and this can be done quite quickly.

It has been one objective of this invention to provide a connector for air-cooled molds used with IS machines which makes a quick-connect and quick-release interconnection between a compressed air source and a mold half. It has been another objective of this invention to provide a connector having the feature just described and which requires no manual steps in connection or disconnection.

It has been another objective of this invention to provide a connector having the features just described and which automatically connects or disconnects the compressed air source with the mold half as that mold half is lifted onto or off of the IS machine's hanger arm in the usual manner.

The connector of this invention includes a seat of generally conical form which is provided on an external vertical surface of the mold. The seat has a coolant inlet passage opening at the center thereof which communicates with the coolant passage in the mold. A coolant manifold is mounted on the hanger arm, and is connected to a coolant source. A valve stem is movably mounted by the manifold, and the stem has a head at one end which is conically tapered to mate with the seat. An axial passage opening through the head is connected to receive pressure air from the manifold. The stem is mounted in a position at which it is in substantial axial alignment with the seat on the mold when the mold is hung on the hanger arm. The stem mounting means provides for axial movement of the stem and head transverse to the direction which a mold is lifted onto and off of the hanger arm. A spring biases the head and stem axially toward an extended position at which the head mates with the seat of a mold, and yieldably accommodates axial camming of the head and stem by the transverse movement of the mold with respect to the stem.

Other objectives and advantages will be more apparent from the following detailed description taken in conjunction with the drawings in which:

FIG. 1 is an overall top plan of a hanger arm mold assembly of a triple gob IS-type glass-forming machine, with the molds together in gob forming position;

FIG. 2 is a top plan similar to FIG. 1 but showing the hanger arms pivoted open to mold-changing position;

FIG. 3 is a vertical cross section taken along line 3—3 of FIG. 2 and illustrates a preferred form of the quick release connector of this invention;

FIG. 4 is a vertical cross section similar to FIG. 3 and illustrates the camming action which takes place in relative transverse movement of the mold half with respect to the connector in making or breaking the connection.

Figure 5:
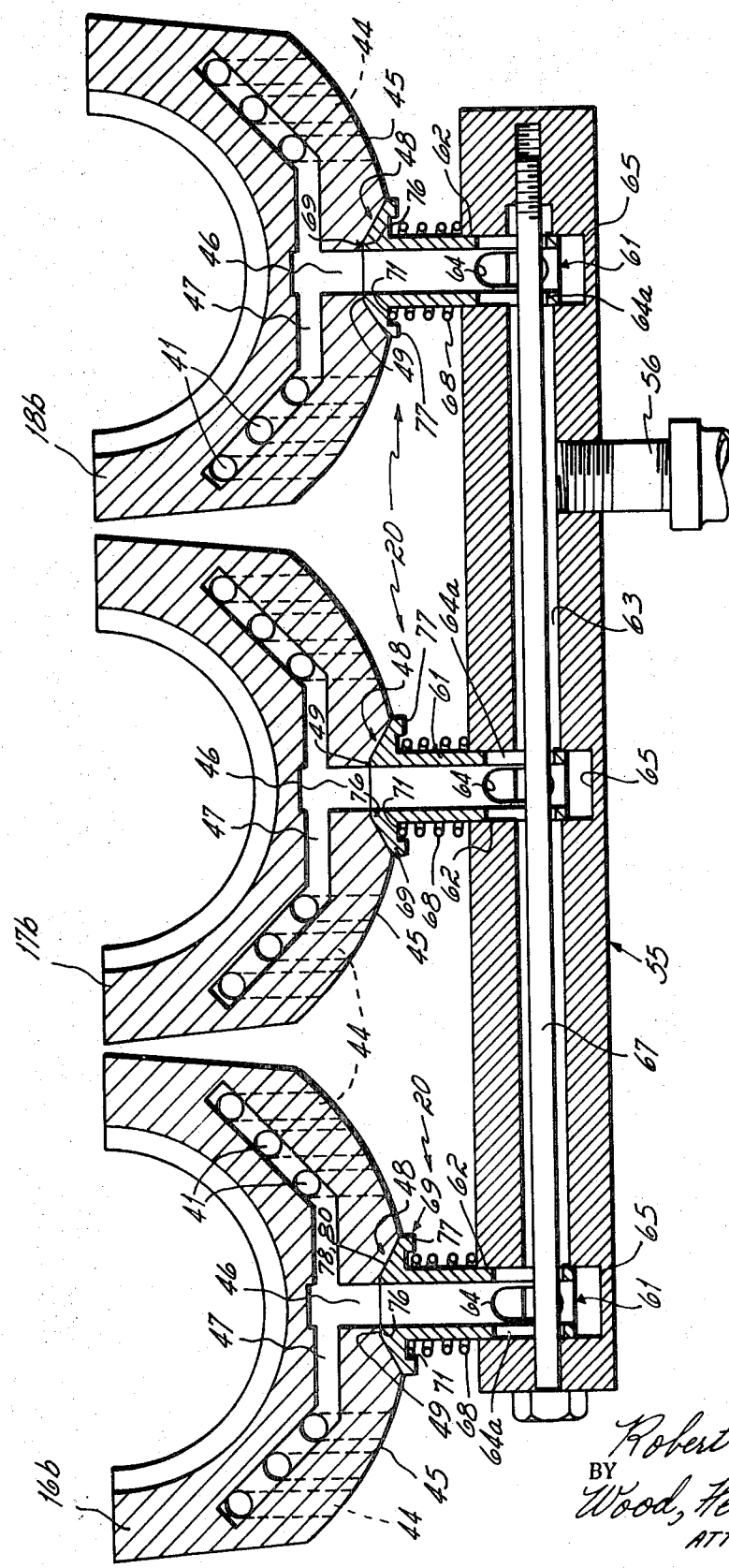
FIG. 5 is a horizontal cross section taken along line 5—5 of FIG. 3.

Shown in FIG. 1 for purposes of explanation is a single section of a triple-gob IS machine which has three molds 16, 17, and 18 for processing three gobs of glass at the same time at each section. The molds 16–18 are hung on, i.e., supported by, hanger arms 11, 12. Each hanger arm 11, 12 is comprised of an upper limb 11a, 12a and a lower limb 11b, 12b, see FIGS. 3 and 4.

The two hanger arms 11, 12 are pivotally connected, as at 15, at the shoulders 13, 14, see FIG. 1. The pivotal connection 15 permits the hanger arms to swing in pincerlike fashion between a closed or molding attitude illustrated in FIG. 1 and an open or release attitude illustrated in FIG. 2. When the hanger arms 11, 12 are in the closed attitude, the molds 16–18 hung on the hanger are ready to receive gobs of molten glass from a glass feeder, not shown, for forming into the desired configuration. When the hanger arms 11, 12 are in the open attitude, the molds 16–18 are separated into halves 16a, 16b, 17a, 17b, 18a, 18b, one-half of each mold hanging from and supported by each hanger arm. In this open attitude, the molded glass article is released from the mold halves 16a, 16b, 17a, 17b, 18a 18b. When the mold halves are in the open attitude they can be easily lifted off or lifted onto the hanger arms 11, 12. This permits the installing of other molds which may have different internal cavity configurations, but with outside configurations which are similar in relevant part, as necessary for changing designs or for replacement of checked, cracked or defective molds.

The connector of this invention is especially useful with a triple-gob machine of the general type shown in the figures because of the critical limiting effect of temperature on such machines and because of the large number of molds which require replacement or change. However, it is also useful with double-gob machines (which have hanger arms adapted to hold two molds), and with single-gob machines.

A preferred form of the connector is designated at 20 in FIGS. 3–5. Each hanger arm 11, 12 has mounted to it a single mold insert or holder 21 and a double-mold insert or holder 22, see FIGS. 1 and 2. A single mold holder 21 is positioned on arm 11 adjacent the pivot point 15 thereof, and another is positioned on arm 12 adjacent the outer end thereof. A double mold holder 22 is positioned adjacent the end of hanger arm 11, and on hanger arm 12 adjacent the pivot 15. The single mold holders 21 are pivotally mounted as at 23, and the double mold holders 22 are pivotally mounted as at 24. Each of the single 21 and double 22 mold holders has an upper hand and a lower hand as shown at 21a, 22a and 21b, 22b, respectively. The mold holders 21, 22 are provided on the corresponding upper and lower limbs of the hanger arms 11, 12, see FIGS. 3 and 4.

The structure of each hand of the molds in holders 21, 22 is the same for all of the mold holders except that the single mold holder 21 structure is essentially one-half of the double mold holder 22. The structure will be particularly described in connection with those hands 21a, 21b on which mold half 16b hangs, shown in FIGS. 3–5. The hands 21a, 21b of the single mold holder 21 on hanger arm 12 each present an upper 31 and a lower 32 arcuate neck (as viewed from the top) against which the side of the mold half 16b is abutted or supported. The curvature of the arcuate necks 31, 32 conforms with the arcuate curvature of the curved mold side 45, see FIG. 1. The neck 31, 32 on each hand 21a, 21b is provided with a rib or flange 37a, 37b extending upward from the top surface 38 thereof. The curvature of the ribs 37a, 37b is the same as that of necks 31, 32 (as viewed from the top).

Each mold half 16a–18b is provided with a plurality of coolant bores or passages 41, which may be in the form of vertical holes drilled from the top face 42 down toward the bottom face 43 of each mold half, see FIGS. 3 and 4. The bores 41 vent to the atmosphere at the top face 42, and ports 44 are provided toward the bottom face 43 to vent same to the atmosphere through the curved sidewalls 45. An inlet bore 46 interconnects all the vertical bores 41 through a bore 47. The inlet bore 46 extends and opens to the mold's vertical side face 45, and is directed generally radially into that mold half. The inlet bore 46 meets the side face 45 in a conical seat 48, the sides of the conical seat tapering inwardly from side face 45 to form a seat bottom 49.

Each mold half 16a–18b is provided with one or more bolts or locking means 51 on its side wall 45 intermediate the top 42 and bottom 43 faces thereof. An arcuate flange 52 defining a downwardly opening arcuate groove 53 is provided integral with each mold half around the top face 42 thereof. The flange 52 and the bolts 51 are so spaced relative one to the other in the vertical direction as to cooperate with the upper 21a and lower 21b limbs respectively of the hanger arm 12. Essentially the flange 52 and bolts 51 function as fasteners in cooperation with ribs 37a, 37b on the mold holders to hold the molds 16–18 snugly in proper position on the hanger arms 11, 12. As illustrated in FIG. 3, the groove 53 defined inside of flange 52 is seated over rib 37a on hand 21a and the bolts 51 are seated over rib 37b on hand 21b. Note that the bottom of groove 53 lies on the top of rib 37a, and that the lower side of bolt 51 lies on the top of rib 37b. Each mold thus hangs from the hanger arm 11 or 12 and is retained thereon from movement in the horizontal plane.

Each connector 20 of this invention is interconnected with a compressed air source, not shown, through a manifold 55 and feed line 56, see FIGS. 3–5. The source may be the usual plant source of compressed air. A manifold and three connectors are provided for the three mold halves on each mold arm.

The manifold 55 and connector 20 associated with hanger arm 12 and mold half 16b are described in detail, the structure associated with the other arms and molds is similar. Manifold 55 is mounted on hanger arm 12 through supports or brackets 57. As illustrated in FIG. 5, the manifold 55 mounts connectors for serving each of the three mold halves 16b, 17b, 18b hung on arm 12. A similar manifold and connector assembly is mounted on the opposite hanger arm 11 to serve the opposite mold halves 16a, 17a, 18a.

Each connector 20 includes a hollow stem or sleeve 61 which is slidably received in a manifold port 62. The manifold port 62 is sized to permit the hollow stem 61 to reciprocate between a retracted or disengaged position, see FIG. 4, and an extended position, see FIG. 3, while maintaining air communication between the internal manifold chamber 63 and the interior of each hollow stem. Such air communication is provided by elongated holes or slots 64 located at four positions about the hollow stem 61. The axial elongation of holes 64 connects the stem to the manifold chamber 63 in any axial position of the stem.

A flat stop 65 is provided at that side of the manifold chamber 63 which is opposite each port 62, the stop sides acting to guide the stem 61 as it moves axially. The squared bottom of the stop prevents the stem 61 from binding.

An elongated bolt or pin 67 extends longitudinally through the manifold chamber 63. The bolt 67 passes through opposite elongated holes 64a of each of the stems 61. The connector stems 61 are urged toward the extended position by springs 68 around them, and bolt 67 limits such extension.

The spring 68 at one end abuts against manifold 55 and abuts a head 69 on stem 61 at the other end, the spring end being received in annular groove 71 in the head. The head 69 is sized and configured to mate with seat 48 on the cooperating mold half. In cross section, head 69 is preferably of a frustoconical configuration, the end face 76 of the head being of a smaller diameter than the base 77 of the head. The taper of the cone is oblique; an acute taper would hinder camming.

The connector operates automatically to connect and disconnect the manifold 55 (and, hence, the compressed air source) and the inlet port 46 of each mold half it serves when a mold half is lifted on or off the hanger arm. That is, no manual attention to making the pressure connection is required during changing of mold halves. Further, this structure can be installed on existing IS machines by relatively inexpensive modification of existing hanger arms 11, 12.

When a mold half is being placed or hung in operative engagement on the hands 21a, 21b on the hanger arm's limbs 12a, 12b, the mold half is first moved generally vertically until the rim 37a of hand 21a will clear beneath flange 52. The mold is then moved horizontally until the side face 45 of the half is flush against or abuts the hands, as shown in FIG. 4. In this attitude the mold side face 45 abuts the head 69 of the connector 20 and pushes stem 61 into the manifold to its retracted position. Subsequently, the mold half is allowed to drop downward, i.e., moved transverse to the axis of the stem 61, until the mold half hangs on hands 21a, 21b as shown in FIG. 3. The spring 68 biases stem head 69 into seat 48 on the mold half as the latter approaches its operating position shown in FIG. 3, thus automatically locating the head 69 in the seat 48 and connecting the compressed air source with the coolant bore 46. The camming action of the tapered face 78 on head 69 in combination with the tapered sides 80 of seat 48 assures that the stem 61 is automatically centered and socketed as shown in FIG. 3 when the bore of stem 61 is aligned with the inlet bore 46 of mold half 16. The "seal" achieved at the interface between head 69 and seat 48 is imperfect since the interface is metal on metal, and some air leakage does usually occur at this point. But such leakage is not detrimental because such air cools the mold half exterior. Thus, the transverse or vertical motion of the mold half relative to the stem brings the valve seat into alignment with the valve head and allows seating to occur under the action of the biasing spring. The attachment of the mold half to the hanger arm at vertically spaced connections on either side of the connector positively locks the mold against horizontal displacement which might otherwise be caused by the bias of spring 68.

When the mold half is removed from hanging engagement with the hands 21a, 21b, i.e., with the hanger arm 12, it is first lifted vertically upward from its attitude illustrated in FIG. 3 to that attitude illustrated in FIG. 4. As the mold half moves upward, the head 69 is essentially cammed out of the seat 48 to that attitude illustrated in FIG. 4. That is, as the mold half is lifted tranversely the stem 61 is caused to move axially toward retracted or disengaged position. From the attitude illustrated in FIG. 4, i.e., where flange 52 and bolts 51 clear ribs 37a, 37b, the mold half can simply be withdrawn horizontally relative from the hanger arm 12 and moved to storage. Thus, both when the mold half is being lifted off the hanger arm 12 and when it is being lifted on the hanger arm, transverse movement of the mold half across the axis of the stem 61 cams the head 69 out of or into seat 48 on the mold half.

When the mold half is out of engagement with the head 69 and stem 61, pin 67 cooperates with ends of the elongated slots 64a in each stem to prevent the stem and head structure from being pushed out of cooperative engagement with the manifold 55 by spring 68.

It will be apparent from the foregoing disclosure and explanation that in interconnecting a compressed air source, with an inlet bore 46 in a mold half for distributing compressed air through the coolant passages 41 in that mold half, no direct operator attention is required to the connector 20. The connector 20 operates automatically to interconnect the compressed air source with the coolant passages 41 in the mold half as the mold half is hung on the hanger arm 12. Further, the connector 20 operates automatically to disconnect the compressed air source from the mold half as the mold half is lifted off the hanger arm 12. Hence, an operator need only concern himself with the changing of the mold half. This results in an increase in efficiency during changing of the air cooled molds over other connector structures.

Having described in detail the preferred embodiment of my invention, what I desire to claim and protect by Letters Patent is:

1. A self-acting quick-release connector for interconnecting an air coolant source with a coolant passage in a mold for forming glass articles, said mold being of the type which is hung on a hanger arm of a glass molding machine and which is exchangeable with another mold by lifting said mold off said hanger arm and lifting the other mold onto said hanger arm, said connector comprising,
   a connector seat on an external surface of said mold which surface is generally vertically disposed when said mold is hung on said hanger arm,
   a coolant inlet passage opening at the center of said seat and communicating with said coolant passage in said mold,
   a coolant manifold for connection with said coolant source,
   a valve stem having a head at one end thereof, said head having a surface configured to mate with said seat,
   passage means connecting an axial passage in said head with said manifold,
   means mounting said stem adjacent said hanger arm in a position at which said stem is in substantial axial alignment with the seat on a mold hung on said arm, the stem mounting means providing for axial movement of said stem and head in a direction transverse to the direction in which molds are lifted onto and off of said hanger arm,
   and a spring biasing said head and stem axially toward an extended position at which said head mates with the seat of a mold on the arm, the spring yieldably accommodating axial camming of said head and stem by transverse movement of a mold,
   said connector seat and said surface of said head being shaped such that said seat exerts an axial camming force on said stem when said mold is moved transversely to the axis of said stem in lifting said mold on and off said hanger arm.

2. The connector of claim 1 wherein said seat is generally conical and said surface of said head has a corresponding shape such that said seat cams said head axially when moved transversely relative thereto.

3. The connector of claim 2 wherein said seat is an oblique inwardly tapering cone.

4. The connector of claim 1 further wherein said stem has at least two opposed elongated slots formed in it, said slots providing continuous air communication from said manifold into the axial passage in said head over the range of stem movement
   and a pin located within said manifold and extending through said elongated holes, said pin limiting the extension of said stem by said spring.

5. The connector of claim 1 wherein said seat is vertically between an upper point of attachment and a lower point of attachment of said mold to said hanger arm, such that said mold is positively prevented from movement away from said arm under the bias of said spring.

* * * * *